United States Patent [19]

Chen

[11] Patent Number: 4,992,903
[45] Date of Patent: Feb. 12, 1991

[54] STRUCTURE OF COMPUTER MAIN FRAME

[76] Inventor: Charlie Chen, 5F, No. 3, Lane 521, Chung Cheng Rd., Hsin Tien City, Taipei, Taiwan

[21] Appl. No.: 458,275

[22] Filed: Dec. 28, 1989

[51] Int. Cl.⁵ .............................................. G11B 00/00
[52] U.S. Cl. ..................................... 360/137; 364/708
[58] Field of Search ....................... 360/137; 364/708; 361/380, 390, 391, 392, 393, 394, 417, 419, 420, 331, 384; 206/444

[56] References Cited

U.S. PATENT DOCUMENTS

| | | | |
|---|---|---|---|
| 4,272,795 | 6/1981 | Davis, Jr. et al. | 206/444 |
| 4,479,198 | 10/1984 | Romano et al. | 364/708 |
| 4,688,131 | 8/1987 | Noda et al. | 360/137 |
| 4,734,874 | 3/1988 | Hwang et al. | 364/708 |
| 4,853,807 | 8/1989 | Trager | 360/137 |

Primary Examiner—John H. Wolff
Assistant Examiner—Craig A. Renner
Attorney, Agent, or Firm—Lowe, Price, LeBlanc, Becker & Shur

[57] ABSTRACT

A computer main frame includes a bottom block connected with an upper cover through tongue-and-groove joint, for positioning therein of floppy disc and hard disc. The upper cover includes an inner wall surface specially designed to conform to the geometry of the floppy disc and hard disc being received. The floppy and hard disc which are received in the main frame have holes thereon for insertion therein of stub tenons upstanding from the bottom block, such that the positioning of the floppy and hard disc can be secured without the use of any fastening means.

1 Claim, 2 Drawing Sheets

STRUCTURE OF COMPUTER MAIN FRAME

BACKGROUND OF THE INVENTION

The present invention is related to a computer main frame and more particularly to the one in which the positioning of frame structure is efficiently made by means of tongue-and-groove or tenon-and-mortise joint without the use of any hand tool.

In regular computer equipments, the positioning of floppy disc and hard disc in a computer main frame is secured by screws or other fastening means. The use of fastening means makes assembly process time consuming and rather complicated. As a consequence, the manufacturing cost of a computer is relatively increased.

The main object of the present invention is to provide such a computer main frame structure for convenient positioning therein of floppy and hard disc without the use of any fastening means.

Another object of the present invention is to provide such a computer main frame structure which is easy to assemble without the use of any hand tool.

According to the present invention, a computer main frame is generally comprised of a bottom block connected with an upper cover through tongue-and-groove connection for positioning therein of two floppy discs and a hard disc, wherein the upper cover includes two raised side boards at its both lateral sides defining therebetween a stepped slotted inner wall surface having thereon tangent planes in shape and depth conforming to the geometry of the two floppy discs and the hard disc; the bottom block includes a plurality of posts having stud tenons upstanding therefrom for insertion into the holes of the two floppy discs so as to secure the two floppy discs thereto, two chair-like holder plates having stud tenons thereon for insertion into the holes of the hard disc permitting the hard disc to be firmly positioned therein, and two channels on its two lateral side walls to retain the two side boards of the upper cover.

DETAILED DESCRIPTION OF THE PREFERRED EMBODIMENT

Figure 1:
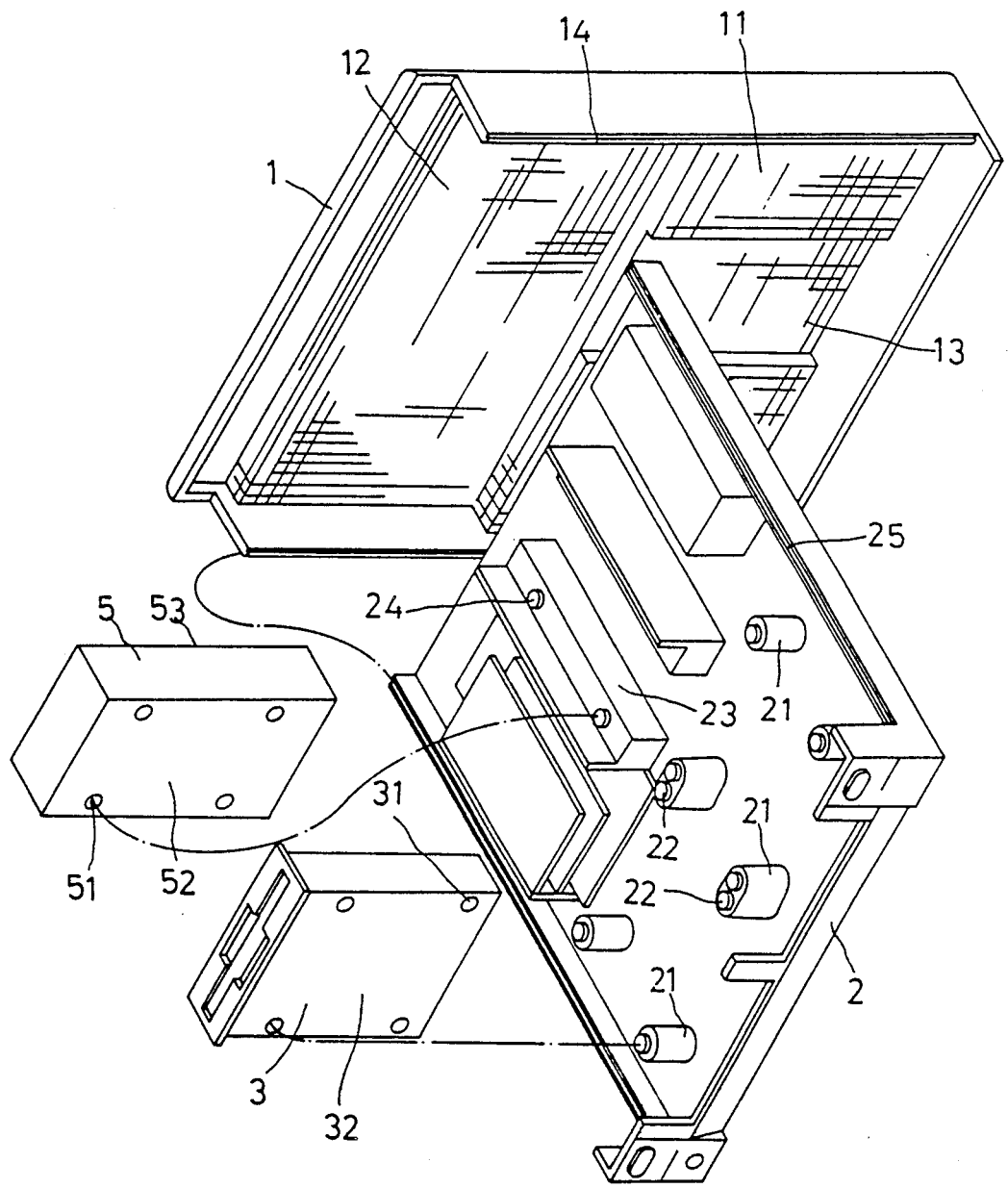
FIG. 1 is a perspective fragmentary view of a computer main frame embodying the present invention.
Figure 2:
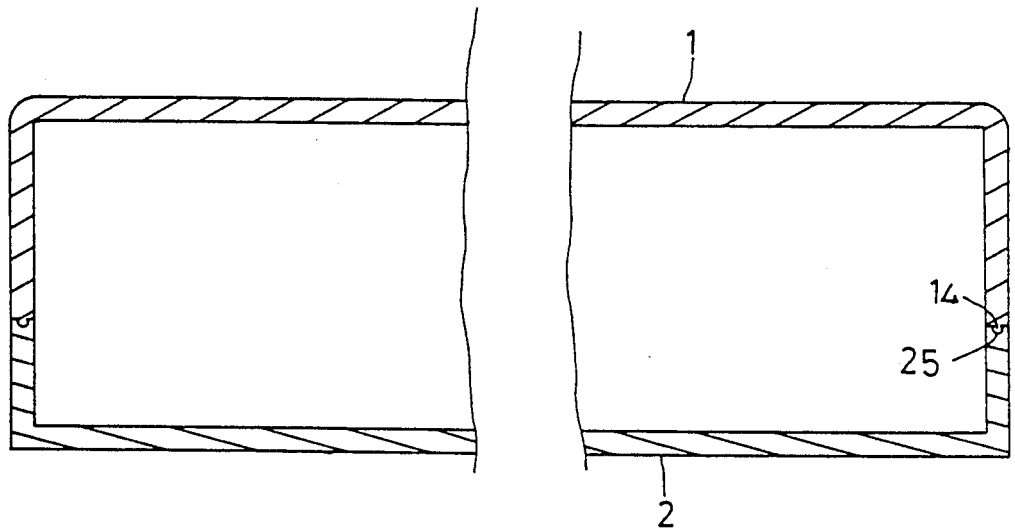
FIG. 2 is a plain sectional view of the computer main frame of FIG. 1.
Figure 3:
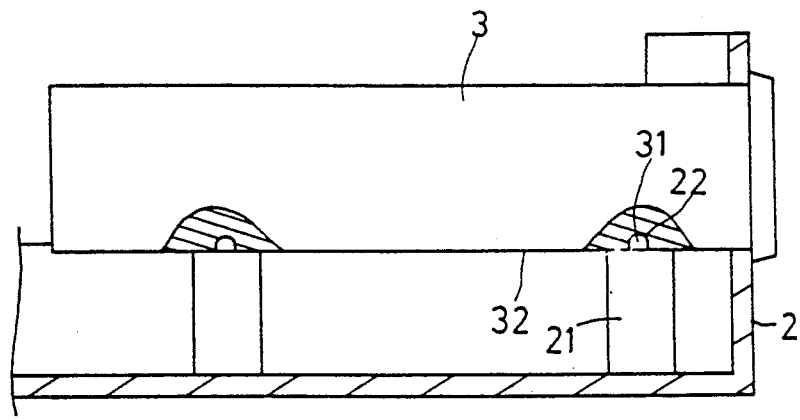
FIG. 3 is a sectional elevation of the computer main frame of FIG. 1.

Turning now to the annexed drawings in greater detail, therein illustrated is a computer main frame embodying the present invention and generally comprised of an upper cover (1), a bottom block (2), two floppy discs (3) and (4) and a hard disc (5).

The upper cover (1) includes two raised side boards (14) at its both lateral sides defining therebetween a stepped slotted inner wall surface (11) having thereon tangent planes (12) (13) in shape and depth conforming to the geometry of the two floppy discs (3) (4) and the hard disc (5).

The bottom block (2) includes a plurality of posts (21) having stud tenons (22) upstanding therefrom, two chair-like holder plates (23) having stud tenons (24) made thereon, two channels (25) on its two lateral side walls.

The floppy discs (3) and (4) and the hard disc (5) each comprises a first large side wall (32) or (42) or (52) having made thereon a plurality of holes (31) or (41) or (51), and a second large side wall (33) or (43) or (53) opposite to the first large side wall (32) or (42) or (52).

During assembly, the floppy discs (3) and (4) are mounted on the posts (21) of the bottom block (2) permitting the stub tenons (22) of the posts (21) to respectively insert into the holes (31) and (41) of their first large side walls (32) and (42) thereof, the hard disc (5) is mounted on the two chair-like holder plates (23) of the bottom block (2) permitting the stub tenons (24) of the chair-like holder plates (23) to respectively insert into the holes (51) of its first large side wall (52), and the upper cover (1) is mounted on the bottom block (1) with its two side boards (14) respectively seated in the two channels (25) of the two lateral side walls of the bottom block (2) permitting the second large side walls (33), (43) and (53) of the floppy discs (3) and (4) and the hard disc (5) be respectively received in its tangent planes (12) and (13).

According to the present invention, the width of the two channels (25) of the bottom block (2) is slightly smaller than the thickness of the two side boards (14) of the upper cover (1). Therefore, after the two side boards (14) of the upper cover (1) are respectively inserted in the two channels (25) of the two lateral side walls of the bottom block (2), the upper cover (1) comes to be firmly retained by the bottom block (2).

Through the arrangement of the foregoing statement, the positioning of the floppy discs (3) and (4) and the hard disc (5) and the upper cover (1) can be made by hands without the use of any hand tools.

I claim:
1. A computer main frame, including:
   an upper cover comprising two raised side boards at its opposed lateral sides defining therebetween a stepped slotted inner wall surface having thereon tangent planes in shape and depth conforming to the geometry of two floppy discs and a hard disc received therein, said floppy discs and said hard disc having enclosures with a plurality of holes;
   a bottom block comprising a plurality of posts having stub tenons upstanding therefrom, two chair-like holder plates having stub tenons made thereon, two channels on its two lateral side walls;
   wherein said floppy discs and said hard disc are mounted on said bottom block permitting the stub tenons of said posts and said chair-like holder plates, respectively, to be inserted into the holes thereof, and said upper cover is mounted on said bottom block to retain said floppy discs and said hard disc therein with its two side boards respectively seated in the two channels of the two lateral side walls of said bottom block.

* * * * *